(12) United States Patent
Ju

(10) Patent No.: US 6,324,150 B1
(45) Date of Patent: Nov. 27, 2001

(54) OPTICAL PICKUP HEAD USING MULTIPLE LASER SOURCES

(75) Inventor: Jau-jiu Ju, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/304,468

(22) Filed: May 3, 1999

(30) Foreign Application Priority Data

Mar. 16, 1999 (TW) .................................................. 88103993

(51) Int. Cl.[7] .................................................. G11B 7/135
(52) U.S. Cl. .................................. 369/112.19; 369/112.21
(58) Field of Search .......................... 369/112.19, 112.21, 369/112.28; 359/495–496, 837

(56) References Cited

U.S. PATENT DOCUMENTS

| | | | |
|---|---|---|---|
| 4,694,447 | * | 9/1987 | Cohen et al. . |
| 4,716,283 | * | 12/1987 | Ando . |
| 5,311,496 | * | 5/1994 | Whitehead ............................ 369/112 |
| 5,684,781 | * | 11/1997 | Jeong .................................... 369/112 |
| 6,084,841 | * | 7/2000 | Sugiura et al. ....................... 369/112 |

* cited by examiner

*Primary Examiner*—W. R. Young
(74) *Attorney, Agent, or Firm*—W. Wayne Liauh

(57) ABSTRACT

An optical pickup head which utilizes two or three laser beams of different wavelengths for reading or writing data on different kinds of optical recording media through a same optical output path is disclosed. According to the present invention, a beam shaper located in optical paths of multiple laser beams is used. The beam shaper is composed of two prisms in which several laser beam interfaces are formed. Each laser beam interface is furnished with a specific coating for reflecting laser beam of a specific wavelength and transmitting and refracting laser beams of other wavelengths. Therefore, laser beams in different wavelengths can be shaped into a same optical output path for reading and writing data from optical recording media. The laser beams passing through the beam shaper can be eliminated of their chromatic aberrations, and improved their cross-sectional shapes to get higher usage efficiencies of the laser beams. And, the optical pickup head is constructed as a compact unit with small size.

18 Claims, 9 Drawing Sheets

OPTICAL PICKUP HEAD USING MULTIPLE LASER SOURCES

BACKGROUND OF THE INVENTION

The present invention generally relates to an optical pickup head, and more particularly to an optical pickup head which utilizes several laser beams of different wavelengths for reading or writing data on different kinds of optical disc.

An optical pickup records and reproduces information such as video or audio data onto/from recording media, e.g., laser discs. A disc has a structure that an information-bearing surface is formed on a substrate. Regular compact disc drivers are designed subject to the specifications of the laser discs. Currently, a DVD (digital versatile disc) driver is designed to read/write data on different kinds of optical disc, such as CD (compact disc) or DVD. The reading or writing is made by an optical pickup head which can provide two focusing points on an information-bearing surface of the disc which has a specific thickness. The thickness of the disc is defined as a distance from the surface of the disc to the information-bearing surface. When reading, the laser beam reflected from the disc and bearing the data signal is transformed by a photo detector into recognizable electrical signal. A similar process is generated for data writing.

The following is a table listing the specifications of the disc and the laser light for a CD and a DVD:

|     | THICKNESS (mm) | TRACK PITCH (μm) | WAVELENGTH (nm) | NA (numerical aperture) |
| --- | --- | --- | --- | --- |
| CD  | 1.2 | 1.6 | 780 | 0.45 |
| DVD | 0.6 * 2 | 0.74 | 635–650 | 0.6 |

Because the thickness of a CD is different from that of a DVD, for the requirement of compatibility, a DVD driver must be designed to read discs of different thickness. There are several methods which achieve this requirement. These methods include:

1) using two objective lenses with different focuses, and selecting one of them corresponding to the CD or DVD by a driving mechanism such as a rotary mechanism. But the two objective lenses greatly increase the weight of the pickup head and the price of the product;

2) providing a diffraction member for the objective lens and performing two focuses;

3) using a HOE (holographic optical element) to provide two focusing points. But the efficiency of usage of laser light is decreased, and the HOE is difficult and expensive to be manufactured;

4) using an LCD (liquid crystal display) shutter as an NA controller which produces two numerical apertures from a single wavelength laser. However, it is difficult to be installed since the polarization of the laser light source must be properly arranged relative to the LCD and polarizer. Moreover, the LCD needs continuous power supply to maintain shutter effect;

5) providing an objective lens having a near axial region which includes a center of the light path and a far axial region located radially outward from the intermediate region, using electric signals corresponding to the near axial region converted in only the inner photodetector when the light is reflected from a CD; and using electric signals corresponding to both near and far axial regions converted in both the inner and outer photodetector when the light is reflected from a DVD. This is disclosed in U.S. Pat. No. 5,665,957. It has the disadvantages of higher manufacturing cost, lower acceptable tolerance or higher precision demand of installation, and decreasing the laser efficiency about 15%;

6) as disclosed in U.S. Pat. No. 5,777,970, providing a first optical system which leads the laser beam output from a first laser diode and a second optical system which leads the laser beam output from a second laser diode, providing an optical element which has refractivity to either the first optical system or the second optical system, and driving either the first laser diode or the second laser diode according to the type of the loaded optical disc. The drawbacks are that it is expensive and complicated in structure; and 7) adjusting an electronic aperture ring to change the numerical aperture, and change the distance between the disc and the object lens subject to type of the disc used. Similar designs are disclosed in U.S. Pat. No. 5,659,533 and U.S. Pat. No. 5,281,797.

SUMMARY OF THE INVENTION

The primary objective of the present invention is to provide an optical pickup head which utilizes two or three laser beams of different wavelengths for reading or writing data on different kinds of optical recording media through a same optical output path.

According to the present invention, a beam shaper located in optical output paths of multiple laser beams is used. The beam shaper is composed of two prisms in which several laser beam interfaces are formed. Each laser beam interface is furnished with a specific coating for reflecting laser beam of a specific wavelength and transmitting and refracting laser beams of other wavelengths. By accommodating the angles and the material of the prisms, laser beams in different wavelengths can be shaped into a same optical output path for reading and writing data from optical recording media of different densities.

Another objective of the present invention is to provide an optical pickup head which utilizes multiple laser sources and is constructed as a compact unit with small size.

According to the invention, several laser beams of different wavelengths are incident to a beam shaper from different planes individually, then reflected or refracted via some optical interfaces and composed into an output path, therefore, no complicated components or complicated optical paths are needed.

A further objective of the present invention is to provide an optical element of a pickup head in which laser beams can be enlarged, and a higher usage efficiency of laser beam can be obtained.

BRIEF DESCRIPTION OF DRAWINGS

The above objects and advantages of the present invention will become more apparent from the following detailed description preferred embodiments thereof with reference to the attached drawings in which.

DETAILED DESCRIPTION OF PREFERRED EMBODIMENTS

Figure 1:
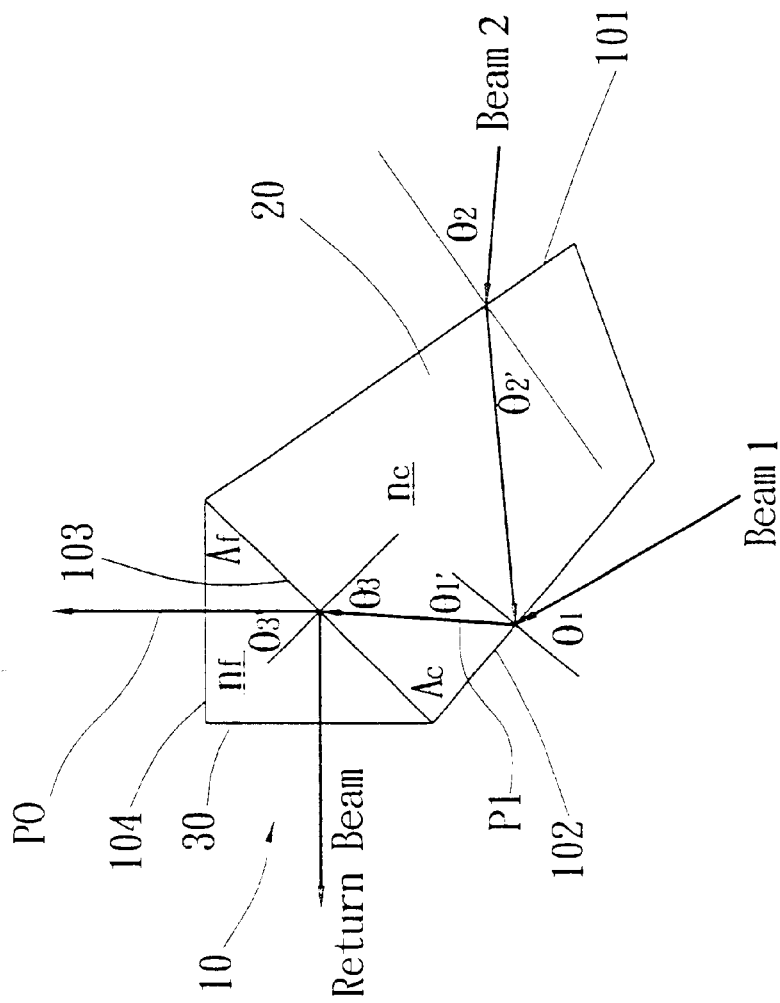
FIG. 1 is a sectional view of a beam shaper for pickup head according to the present invention showing two laser beams of different wavelengths composed into a same output path.

Referring to FIG. 1, the beam shaper 10 applicable to a pickup head according to the invention is consisted of a first prism 20 and a second prism 30 which have different refraction indexes. The beam shaper 10 is formed with several planes locating in different angles. The planes include at least an incident laser plane 101, a first beam-composing interface 102 and a second beam-composing interface 103. The incident plane 101 and one of the first and second beam-composing interfaces are formed on a same prism, while the other beam-composing interface is formed on the conjunction plane of the first prism 20 and the second prism 30. The beam shaper 10 will be installed in the optical path of a multiple laser source pickup head for composing several laser beams of different wavelengths into a single optical output path ($P_O$), therefore enables the pickup head using several different laser beams to read and write data from the optical recording media of different densities, e.g. CD and DVD, through a same optical path.

In the embodiment shown in FIG. 1, the beam shaper 10 is composed of a quadrilateral prism as a first prism 20 and a right triangular prism as a second prism 30. The incident laser plane 101 enables a second laser beam (Beam 2) coming into the beam shaper 10 and refracted to the first beam-composing interface 102. The first beam-composing interface 102 is processed with a specific coating for refracting a first laser beam (Beam 1) coming into the prism 20, but reflecting the second laser beam (Beam 2) coming into the beam shaper 10. Therefore, the first laser beam (Beam 1) and the second laser beam (Beam 2) are composed into the same optical path P1 and coming to the second beam-composing interface 103. The second beam-composing interface 103 is processed with specific coating for passing the first laser beam (Beam 1) and the second laser beam (Beam 2), but reflecting the third laser beam which is the signal beam (Return Beam) returning from the media or actually a third incident laser beam (Beam 3, as shown in FIG. 2) composed into the same optical output path $P_O$.

The beam shaper 10 in FIG. 1 is an example to be used for a two laser source pickup head. The first laser beam (Beam 1) and the second laser beam (Beam 2) are coming from two laser generators, such as laser diodes, of different wavelengths. The Return Beam is the laser beam carrying data signal, reflected from the unshown optical recording media reversely via the optical output path $P_O$ of the first laser beam (Beam 1) and the second laser beam (Beam 2), and reflected by the second beam-composing interface 103 to an unshown photo detector for retrieving the data signal.

Figure 2:
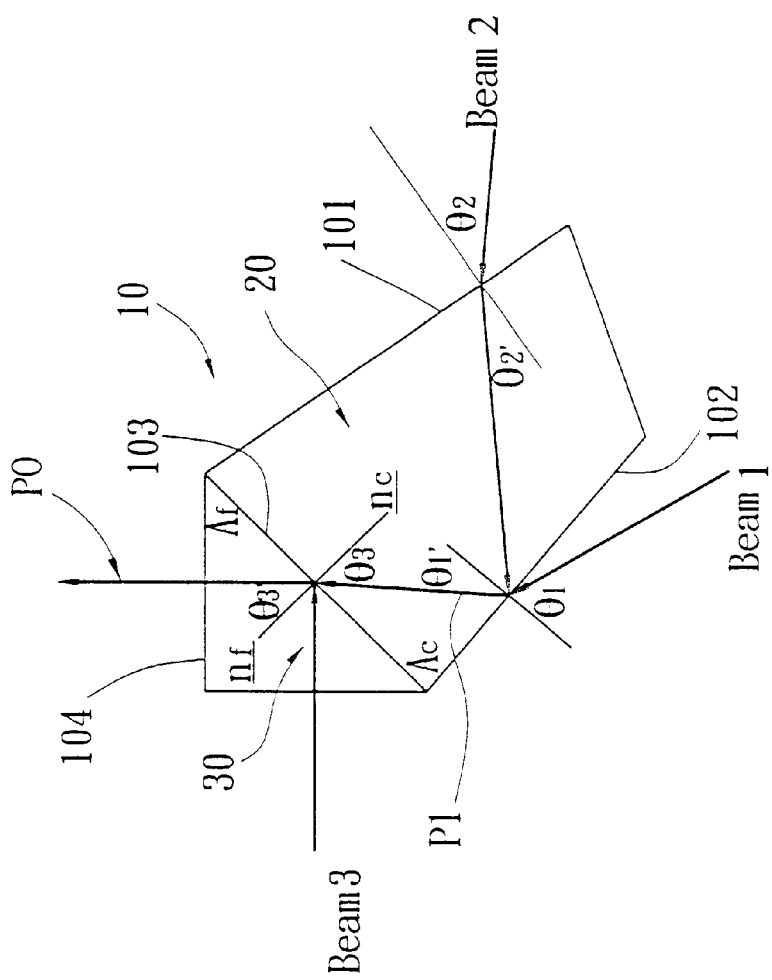
FIG. 2 is another usage view of the beam shaper of FIG. 1 showing three laser beams of different wavelengths composed into a same output path.

Referring to FIG. 2, the beam shaper 10 may also be used for a three laser source pickup head. The first laser beam (Beam 1), the second laser beam (Beam 2) and the third laser beam (Beam 3) are coming from three laser generating elements of different wavelengths, and composed by the first beam-composing interface 102 and the second beam-composing interface 103 into the optical output path $P_O$ for coming to the optical recording media and retrieving the data signal therefrom.

To accomplish the composition of different laser beams to the same output path $P_O$ as described above, the angles and the materials of the first prism 20 and the second prism 30 have to be carefully designed, so that the laser beams of different wavelengths coming to the incident plane 101, reflected or refracted by the first beam-composing interface 102 and the second beam-composing interface 103 can all be lead into the same optical output path $P_O$.

The first prism 20 and the second prism 30 of the present invention are made of materials of different refraction indexes. According to the achromatic theory, matching of an F-series lens with a C-series lens will eliminate the chromatic aberration. And, by the Snell's law, as the formulas listed below, the angle $A_c$ of the first prism 20 and the angle $A_f$ of the second prism 30 can be determined (referring to FIG. 1):

$$n \sin \theta_1 = n_c \sin \theta_{1'}. \qquad (1)$$

$$n \sin \theta_2 = n_c \sin \theta_{2'}. \qquad (2)$$

$$n_c \sin \theta_3 = n_f \sin \theta_{3'}. \qquad (3)$$

in which, $n_c$ is the refraction index of the first prism 20; and $n_f$ is the refraction index of the second prism 30.

Further according to the achromatic theory, $$\frac{A_c(n_c - 1)}{Vd_c} = \frac{A_f(n_f - 1)}{Vd_f} \qquad (4)$$

in which, $A_c$ is the angle of the first prism 20 between the first beam-composing interface 102 and the second beam-composing interface 103;

$A_f$ is the angle of the second prism 30 between the second beam-composing interface 103 and the output plane 104;

$Vd_c$ is the chromatic dispersion ratio, i.e. the Abbe number, of the first prism 20; and $Vd_f$ is the chromatic dispersion ratio, i.e. the Abbe number, of the second prism 30.

Supposing the first prism 20 and the second prism 30 are made of F8 and BK7 glass respectively, and the angles $A_f=45°$, $\theta_{3'}=45°$, then the angle $A_c$ can be calculated from the formula (4); then the angle $\theta_3$ can be calculated from the formula (3), and the angle $\theta_{1'}$ can be calculated from triangle geometry; further the angle $\theta_1$ can be calculated from the formula (1), and the angle $\theta_{2'}$ can be calculated from triangle geometry; and finally the angle $\theta_2$ can be calculated from the formula (2).

If $A_f \neq 45°$, the angle $\theta_{3'}$ can still be found out from the output plane 104, then the rest angles can be calculated in the same way as described above.

The composition of the first prism 20 and the second prism 30 not only combines different laser beams into an optical output path $P_O$, but also eliminates the chromatic aberration of the first laser beam (Beam 1) and the second laser beam (Beam 2) when they passing through the beam shaper 10. Furthermore, when the first laser beam (Beam 1) and the second laser beam (Beam 2) are generated from laser diodes, the cross-sectional shape of the laser beam is originally of elongate ellipses as shown with dashed ellipse in FIG. 9 which will decrease the usage efficiency of the laser beams. But after the first laser beam (Beam 1) and the second laser beam (Beam 2) passing through he first prism 20, they are enlarged into round circular shapes as shown with the rigid circle in FIG. 9, and the usage efficiencies of the laser beams are improved. The enlargement rates of the first laser beam (Beam 1) and the second laser beam (Beam 2) can be calculated from the following formulas:

$$\Gamma_1 = \frac{\cos\theta_{1'}}{\cos\theta_1} \qquad (6)$$

$$\Gamma_2 = \frac{\cos\theta_{2'}}{\cos\theta_2} \qquad (7)$$

in which, $\Gamma_1$ is the enlargement rate of the first laser beam (Beam 1), and $\Gamma_2$ is the enlargement rate of the second laser beam (Beam 2).

Figure 3:
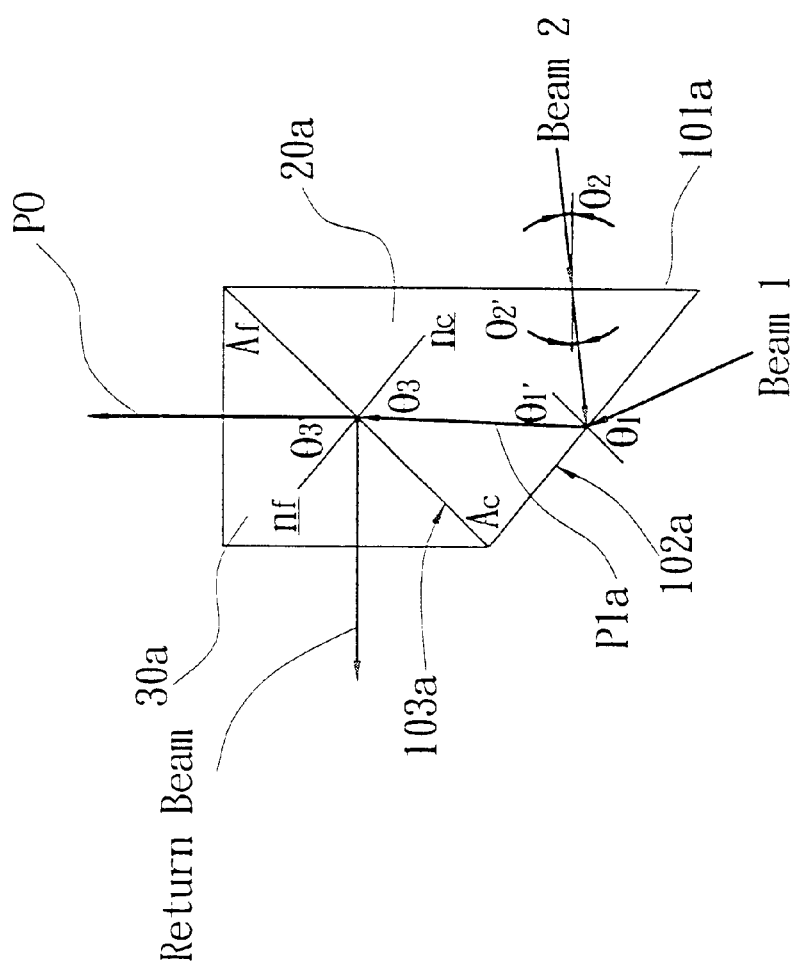
FIG. 3 is a sectional view of a beam shaper as a second embodiment showing two laser beams of different wavelengths composed into a same output path.

Referring now to FIG. 3, a second embodiment of a beam shaper 10a applicable to a pickup head according to the invention is shown. The beam shaper 10a is also consisted of a first prism 20a and a second prism 30a. Differing from the quadrilateral prism 20 shown in FIG. 1 and FIG. 2, the first prism 20a shown in FIG. 3 is also of a triangular prism.

The beam shaper 10a is also formed with several planes locating in different angles. The planes include at least an incident laser plane 101a, a first beam-composing interface 102a and a second beam-composing interface 103a.

In the same way, the angle $A_c$ of the first prism 20a and the angle $A_f$ of the second prism 30a can also be calculated from the aforesaid formulas.

The beam shaper 10a shown in FIG. 3 is used for a two laser source pickup head. The first laser beam (Beam 1) and the second laser beam (Beam 2) are coming from two laser generators, such as laser diodes, of different wavelengths. The Return Beam is the laser beam carrying data signal, reflected from the unshown optical recording media via the optical output path $P_O$ of the first laser beam (Beam 1) and the second laser beam (Beam 2), and reflected by the second beam-composing interface 103a to an unshown photo detector for retrieving the data signal. The incident laser plane 101a enables the second laser beam (Beam 2) coming into the beam shaper 10a with an incident angle $\theta_2$ and refracting to the first beam-composing interface 102a with a refraction angle $\theta_2'$. The first beam-composing interface 102a is processed with a specific coating for refracting a first laser beam (Beam 1) coming into the prism 20a, but reflecting the second laser beam (Beam 2) coming into the beam shaper 10a. Therefore, the first laser beam (Beam 1) and the second laser beam (Beam 2) are composed into the same optical path P1a and coming to the second beam-composing interface 103a. The second beam-composing interface 103a is processed with specific coating for passing the first laser beam (Beam 1) and the second laser beam (Beam 2), but reflecting the third laser beam which is the signal beam (Return Beam) returning from the media or actually a third incident laser beam (Beam 3a, as shown in FIG. 4) composing into the same optical output path $P_O$.

Figure 4:
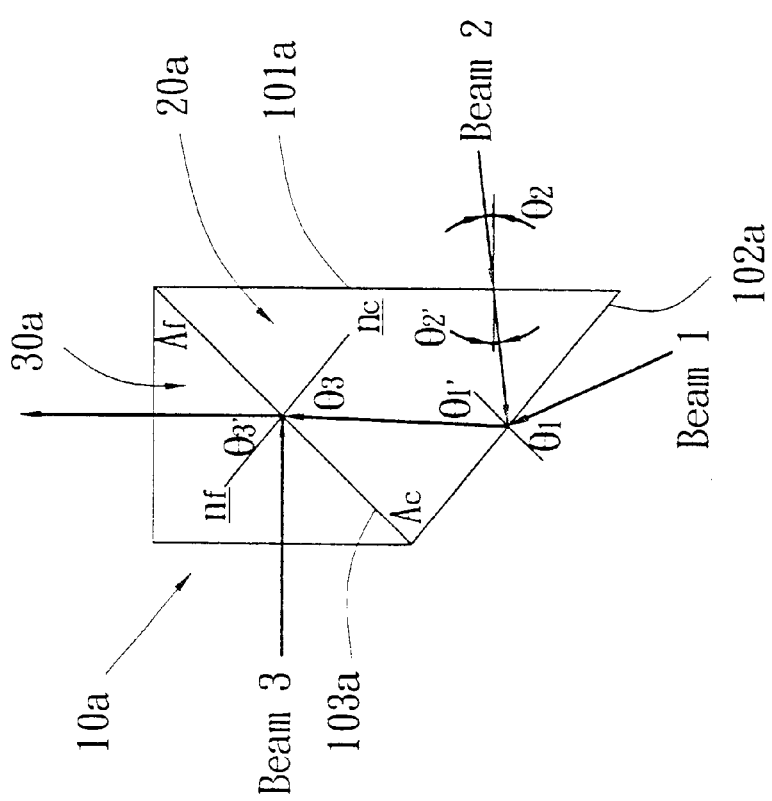
FIG. 4 is another usage view of the beam shaper of FIG. 3 showing three laser beams of different wavelengths composed into a same output path.

Referring to FIG. 4, the beam shaper 10a may also be used for a three laser source pickup head. The first laser beam (Beam 1), the second laser beam (Beam 2) and the third laser beam are coming from three laser generating elements of different wavelengths, and composed by the first beam-composing interface 102a and the second beam-composing interface 103a into the optical output path $P_O$ for coming to the optical recording media and retrieving the data signal therefrom.

Figure 5:
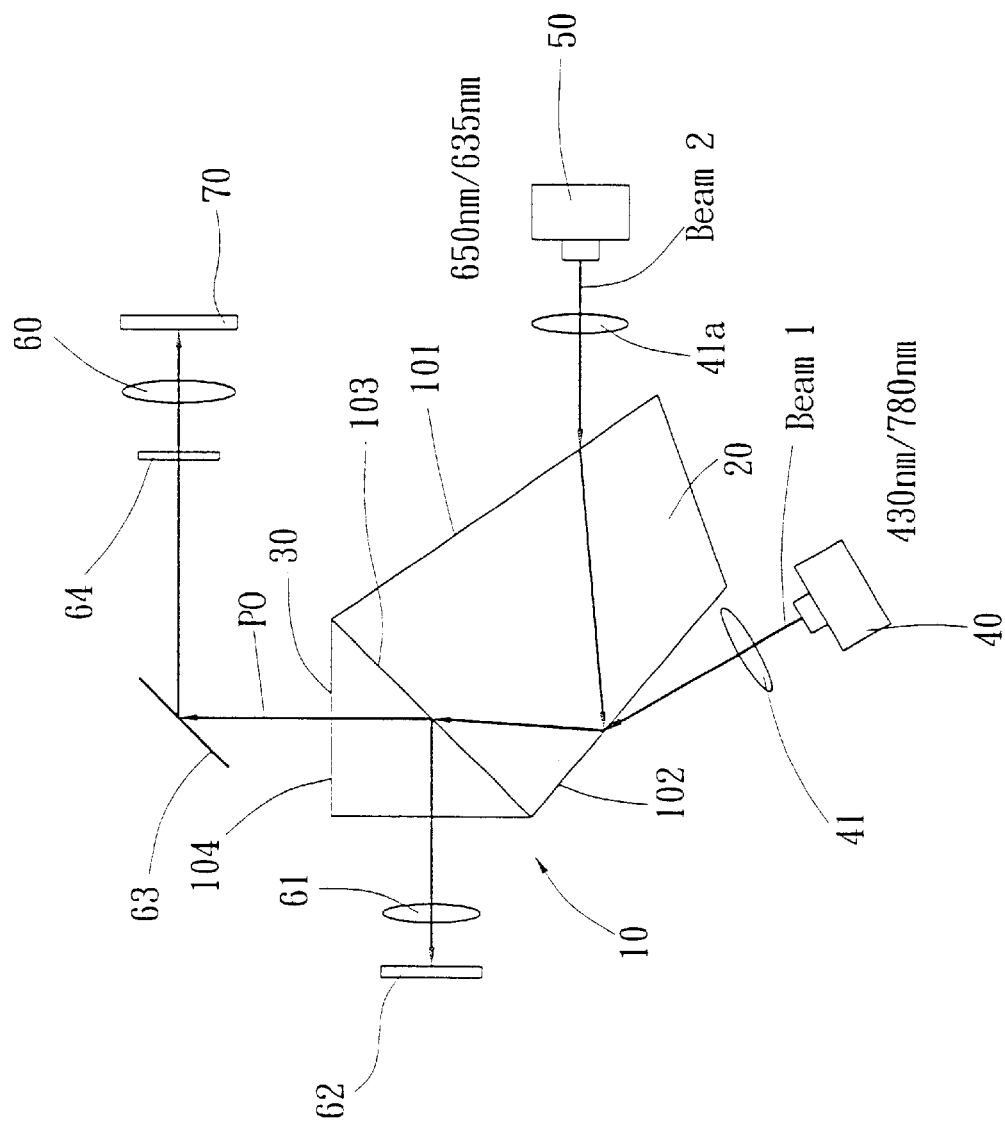
FIG. 5 shows an arrangement of a pickup head according to a first embodiment of the present invention applying the beam shaper of FIG. 1.

Referring to FIG. 5, an arrangement of a pickup head according to the present invention applying the beam shaper of FIG. 1 is shown. The pickup head is applied in a DVD driver capable of reading/writing CD and DVD. The pickup head includes a first laser beam generator 40 for providing the first laser beam (Beam 1) and a second laser beam generator 50 for providing the second laser beam (Beam 2). The two laser beam generators are laser diodes or other similar elements. The wavelength of the first laser beam is 430 nm or 780 nm for reading/writing data of a DVD. The wavelength of the second laser beam is 650 nm or 635 nm for reading/writing data of a CD.

The first laser beam (Beam 1) first passes through a first collimator lens 41 to become a parallel beam, then refracted by the first beam-composing interface 102, further refracted by the second beam-composing interface 103, then comes out along the output path $P_O$, and finally focused by an objective lens 60 onto the information-bearing surface of a optical recording media 70 as an reading/writing spot. The beam containing data and reflected from the optical recording media 70 reversely goes along the output path $P_O$, then reflected by the second beam-composing interface 103 and focused by a lens 61 to a photo detector 62. The photo detector 62 will transform the reflected beam into corresponding signals which represents data retrieval from the optical recording media 70. The writing procedure is done through the same optical path.

As for the second laser beam (Beam 2), it will first pass through a second collimator lens 41a to become a parallel beam, refracted by the incident plane 101, reflected by the first beam-composing interface 102, then, in the same way, refracted by the second beam-composing interface 103, comes out along the output path $P_O$, and finally focused by the objective lens 60 onto the information-bearing surface of the optical recording media 70 as an reading/writing spot. The beam containing data and reflected from the optical recording media 70 reversely goes along the output path $P_O$, then reflected by the second beam-composing interface 103 and focused by the lens 61 to the photo detector 62 for accomplishing data retrieval.

Figure 6:
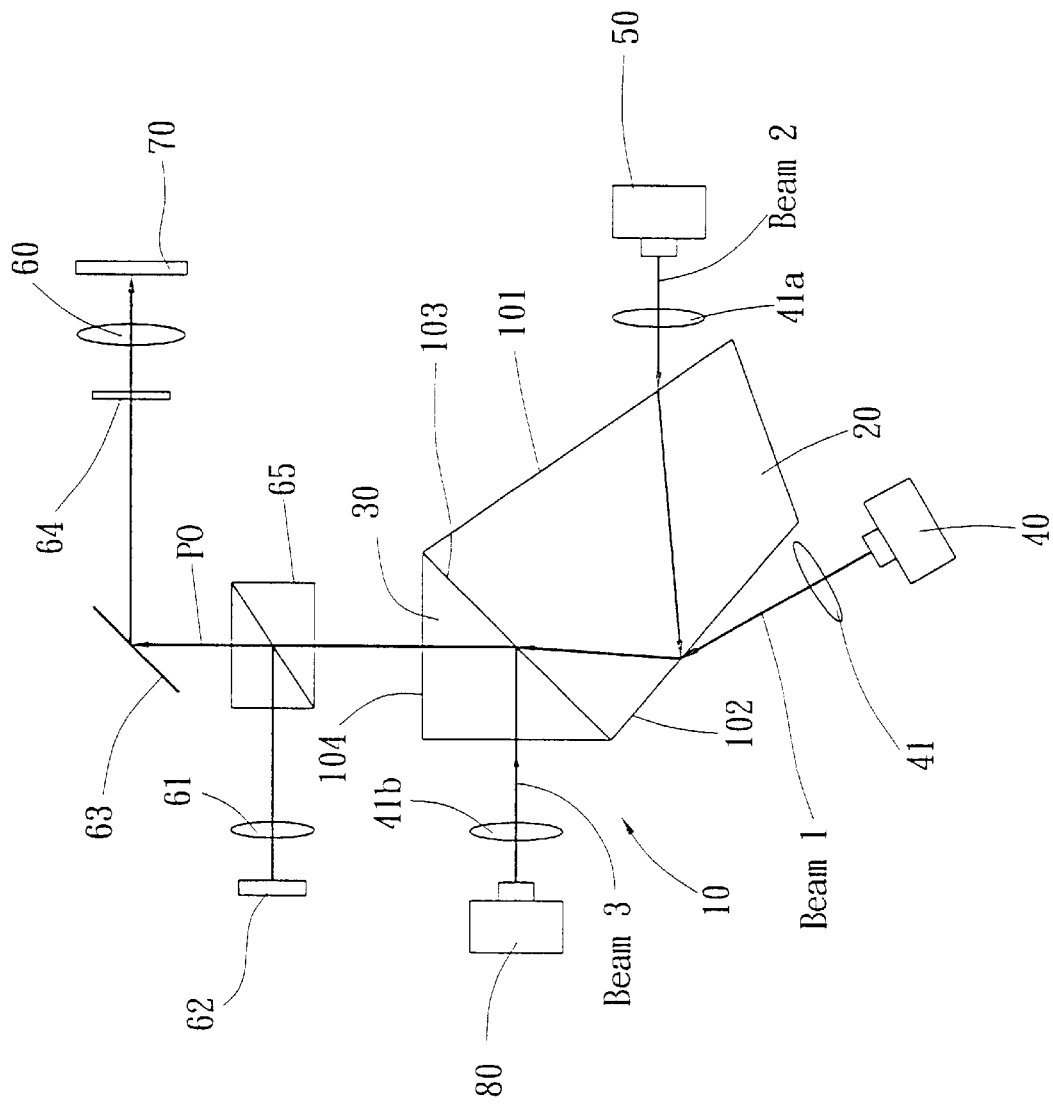
FIG. 6 shows an arrangement of a pickup head according to a second embodiment of the present invention applying the beam shaper of FIG. 2.

FIG. 6 shows another arrangement of a pickup head for reading/writing CD or DVD according to the present invention in which three laser sources are applied. The pickup head includes a first laser beam generator 40 for providing the first laser beam (Beam 1), a second laser beam generator 50 for providing the second laser beam (Beam 2) and a third laser beam generator 80 for providing the third laser beam (Beam 3). The three laser beam generators are laser diodes or other similar elements. The wavelength of the first laser beam is 430 nm for reading/writing data of a DVD. The wavelength of the second laser beam is 650 nm or 635 nm for reading/writing data of a CD. The wavelength of the third laser beam is 780 nm for reading/writing data of a DVD also.

The optical paths of the first laser beam (Beam 1) and the second laser beam (Beam 2) are the same as that of FIG. 5. The third laser beam (Beam 3) first passes through a third collimator lens 41*b* to become a parallel beam, then comes to the second beam-composing interface 103, refracted by the second beam-composing interface 103, then comes out along the same output path $P_O$ as that of the first laser beam (Beam 1) and the second laser beam (Beam 2), and finally focused by the objective lens 60 onto the information-bearing surface of the optical recording media 70 as an reading/writing spot.

The physical design for retrieving data from the reflective beam from the optical recording media 70 along the output path $P_O$ can be accomplished by the following examples.

First, as shown in FIG. 6, a beam splitter cube 65 is arranged in the optical path $P_O$ between the beam shaper 10 and the objective lens 60. The beam containing data and reflected from the optical recording media 70 along the output path $P_O$ will be reflected by the beam splitter cube 65 and focused by the lens 61 to the photo detector 62 for data retrieval.

Figure 7:
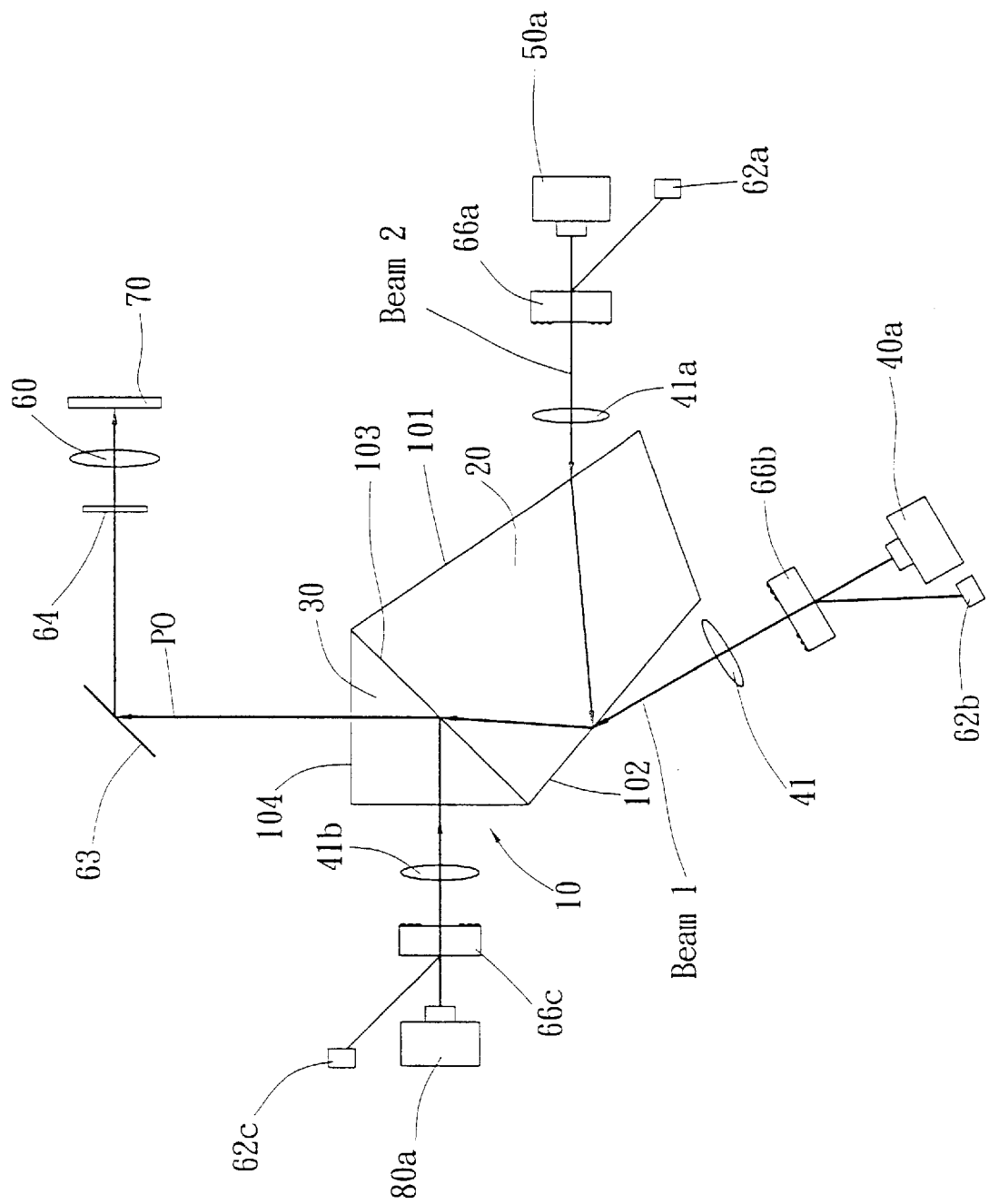
FIG. 7 shows an arrangement of a pickup head modified from the arrangement of FIG. 6.

Second, as shown in FIG. 7, two or three holographic optical elements 66*b*, 66*a* and 66*c* are incorporated respectively with the first laser beam generator 40*a*, the second laser beam generator 50*a* and the third laser beam generator 80*a*. Then, two or three photo detectors 62*b*, 62*a* and 62*c* are used to received respectively the corresponding laser beam separated by the holographic optical elements 66*b*, 66*a* and 66*c* for data retrieval.

Figure 8:
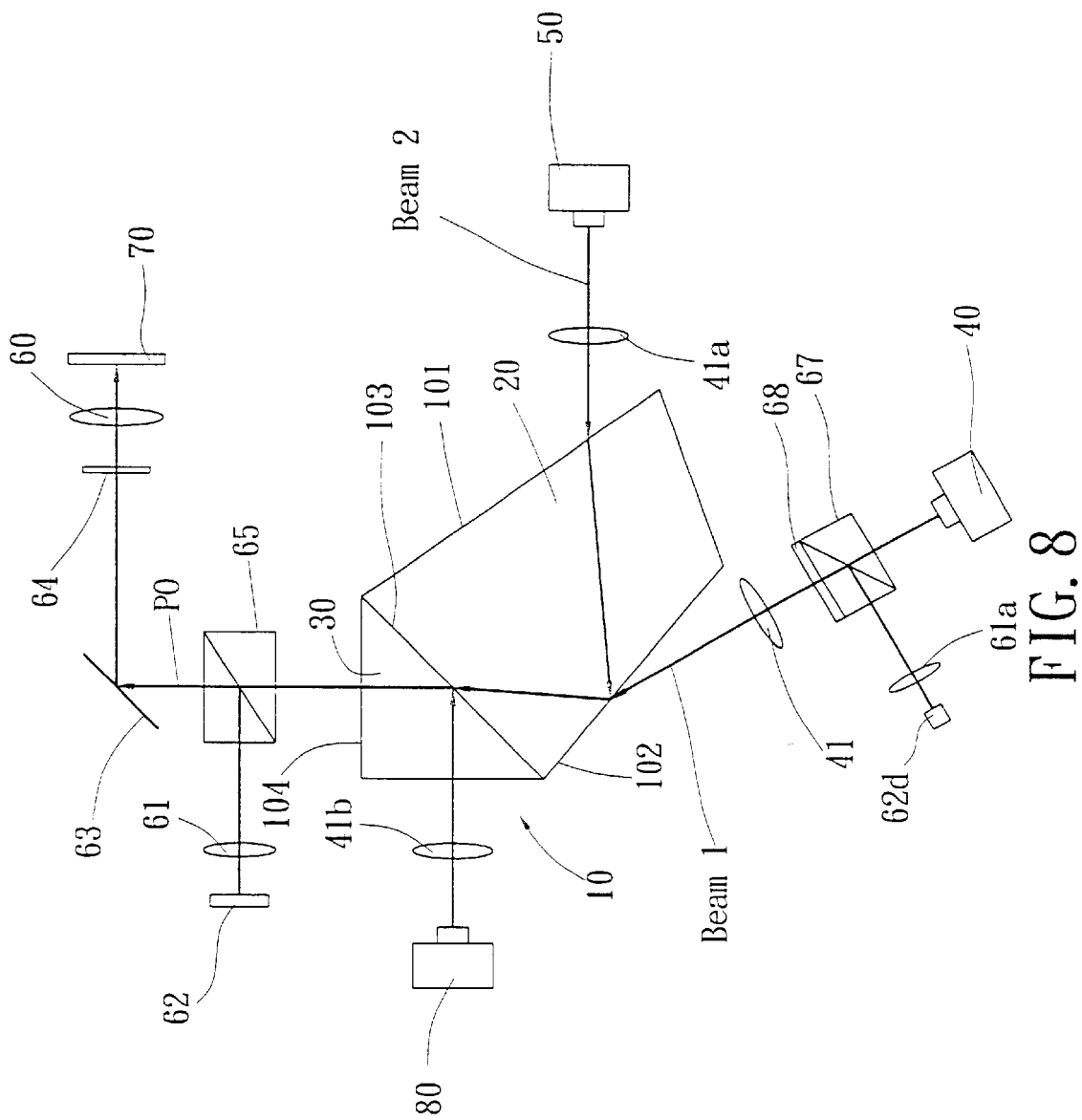
FIG. 8 shows another arrangement of a pickup head modified from the arrangement of FIG. 6.

Third, as shown in FIG. 8, a polarizing beam splitter (P.B.S.) 67 and a quarter wavelength ($\lambda$/4) plate 68 are arranged in the optical path between the first laser beam generator 40 and the first collimator lens 41. Therefore, the laser beam reflected from the optical recording media 70 can be splitted and reflected to the lens 61*a* to the photo detector 62*d* for data retrieval.

As shown in FIGS. 5 to 8, in any arrangement of pickup heads with two or three laser sources, a mirror 63 for changing the direction of optical path, or a filter 64 for changing the numerical aperture can be arranged in the optical path $P_O$ between the beam shaper 10 and the objective lens 60 as required. Of course, the filter 64 can also be replaced by an apparatus having interchangeable objective lenses.

Figure 9:
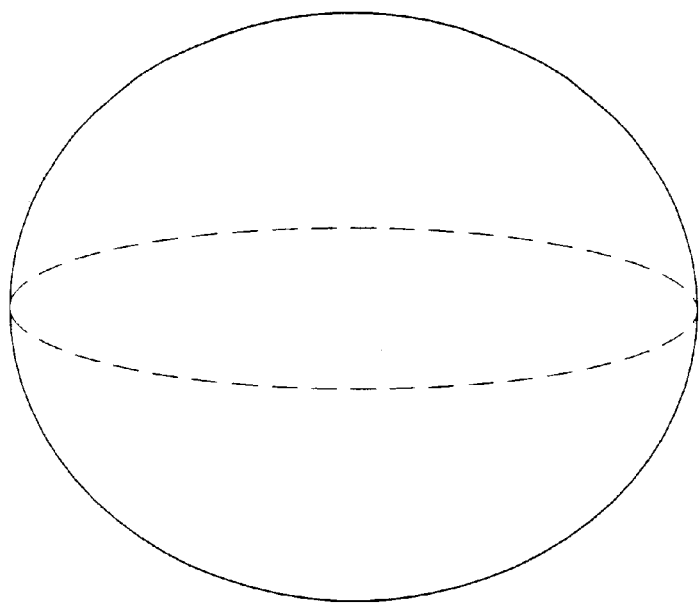
FIG. 9 is a cross sectional view of a laser beam enlarged by a beam shaper according to the present invention.

The advantages of the present invention are as follows:
1) Two or three laser sources are incorporated into a same optical path. So, the multiple laser source pickup head is compact in structure;
2) Applicable to pickup heads with two or three laser sources; and
3) The cross-sectional ellipse shapes of two laser beams can be enlarged into round circular shapes, as shown in FIG. 9, to improve the usage efficiencies of the laser beams.

It is to be understood that the drawings are designed for purposes of illustration only, and are not intended as a definition of the limits and scope of the invention disclosed.

I claim:

1. An optical pickup head using multiple laser sources of different wavelengths for reading/writing data on optical recording media of varying densities, comprising:
    a first laser beam generator and a second laser beam generator, for generating a first laser beam and a second laser beam of different wavelengths, respectively;
    a beam shaper, allocated in optical paths of said first and second laser beams, and formed with a plurality of planes locating in different angles, comprising:
        an incident laser plane for refracting said second laser beam, to generate a refracted second laser beam;
        a first beam-composing interface for composing said refracted second laser beam with said first laser beam into an optical output path;
        a second beam-composing interface for composing said first and second laser beams, after they are being composed by said first beam-composing interface, with a third laser beam into said optical output path;
    an objective lens for focusing laser beams in said optical output path onto said optical recording media as a reading/writing spot; and
    a photo detector for transforming a reflective laser beam returning from said optical recording media into corresponding signals and accomplishing data retrieval;
    wherein said beam shaper is consisted of a first prism and a second prism which have different refractive indexes; said incident laser plane and said first beam-composing interface are formed on a same prism, while said second beam-composing interface is formed on a conjunction plane of said first prism and said second prism.

2. The optical pickup head using multiple laser sources as recited in claim 1 wherein said first laser beam generator and said second laser beam generator are laser diodes.

3. The optical pickup head using multiple laser sources as recited in claim 1 wherein said first prism is a quadrilateral prism, and said second prism is a right triangular prism.

4. The optical pickup head using multiple laser sources as recited in claim 1 wherein said first prism is a triangular prism, and said second prism is a right triangular prism.

5. The optical pickup head using multiple laser sources as recited in claim 1 wherein each said beam-composing interface is furnished with a specific coating for reflecting laser beam of a specific wavelength while refracting laser beams of other wavelengths.

6. The optical pickup head using multiple laser sources as recited in claim 1 wherein said incident laser plane enables said second laser beam to be refracted to said first beam-composing interface; said first beam-composing interface enables said first laser beam to be refracted to form into a refracted first laser beam, but reflecting said second laser beam to form into a reflected second laser beam; further wherein said refracted first laser beam and said reflected second laser beam are composed into a same optical path and coming to said second beam-composing interface; said second beam-composing interface enables said first laser beam and said second laser beam refracting into said optical output, but reflecting said third laser beam.

7. The optical pickup head using multiple laser sources as recited in claim 1 further comprising:
    a first collimator lens located between said first laser beam generator and said beam shaper;
    a second collimator lens located between said second laser beam generator and said beam shaper; and
    a focusing lens located between said photo detector and said beam shaper.

8. The optical pickup head using multiple laser sources as recited in claim 1 wherein said third laser beam is a signal beam returned from said optical recording media.

9. An optical pickup head using multiple laser sources of different wavelengths for reading/writing data on optical recording media of varying densities, comprising:
    a first laser beam generator and a second laser beam generator, for generating a first laser beam and a second laser beam of different wavelengths, respectively;
    a beam shaper, allocated in optical paths of said first and second laser beams, and formed with a plurality of planes locating in different angles, comprising:

an incident laser plane for refracting said second laser beam, to generate a refracted second laser beam;

a first beam-composing interface for composing said refracted second laser beam with said first laser beam into an optical output path;

a second beam-composing interface for composing said first and second laser beams, after they are being composed by said first beam-composing interface, with a third laser beam into said optical output path;

an objective lens for focusing laser beams in said optical output path onto said optical recording media as an reading/writing spot; and a photo detector for transforming a reflective laser beam returning from said optical recording media into corresponding signals and accomplishing data retrieval;

wherein said third laser beam is an incident laser beam generated by a third laser beam generator, refracted to said second beam-composing interface and composed into same optical output path.

10. The optical pickup head using multiple laser sources as recited in claim 9 further comprising:

a first collimator lens located between said first laser beam generator and said beam shaper;

a second collimator lens located between said second laser beam generator and said beam shaper;

a third collimator lens located between said third laser beam generator and said beam shaper;

a focusing lens located between said photo detector and said beam shaper; and a beam splitter cube located in said optical output path between said beam shaper and said objective lens for reflecting said reflective laser beam returning from said optical recording media to said photo detector.

11. The optical pickup head using multiple laser sources as recited in claim 9 wherein said first laser beam generator, said second laser beam generator and said third laser beam generator are incorporated individually with a holographic optical element.

12. A beam shaper, allocated in optical path of multiple laser sources of different wavelengths for reading/writing data on optical recording media of varying densities, and formed with a plurality of planes locating in varying angles, comprising:

an incident laser for refracting a second laser beam to generate a refracted second laser beam;

a first beam-composing interface for composing said refracted second laser beam with a first laser beam into an optical output path; and a second beam-composing interface for composing said first and second laser beams, after they are being composed by said first beam-composing interface, with a third laser beam into said optical output path;

wherein said beam shaper is consisted of a first prism and a second prism which have different refractive indexes; said incident laser plane and said first beam-composing interface are formed on a same prism, while said second beam-composing interface is formed on a conjunction plane of said first prism and second prism.

13. The beam shaper as recited in claim 12 wherein said first prism is a quadrilateral prism, and said second prism is a right triangular prism.

14. The beam shaper as recited in claim 12 wherein said first prism is a triangular prism, and said second prism is a right triangular prism.

15. The beam shaper as recited in claim 12 wherein each said beam-composing interface is furnished with a specific coating for reflecting laser beam of a specific wavelength while refracting laser beams of other wavelengths.

16. The beam shaper as recited in claim 12 wherein said incident laser plane enables said second laser beam refracting to said first beam-composing interface; said first beam-composing interface enables said first laser beam coming into said beam shaper, but reflecting said second laser beam; therefore, said refracted first laser beam and said reflected second laser beam are composed into a same optical path and coming to said second beam-composing interface; said second beam-composing interface enables said first laser beam and said second laser beam refracting into said optical output path, but reflecting said third laser beam.

17. The beam shaper as recited in claim 16 wherein said third laser beam is an incident laser beam generated by a third laser beam generator, refracted to said second beam-composing interface and composed into said same optical output path.

18. The beam shaper as recited in claim 16 wherein said third laser beam is a signal beam returned from said optical recording media.

* * * * *